Figure 1:
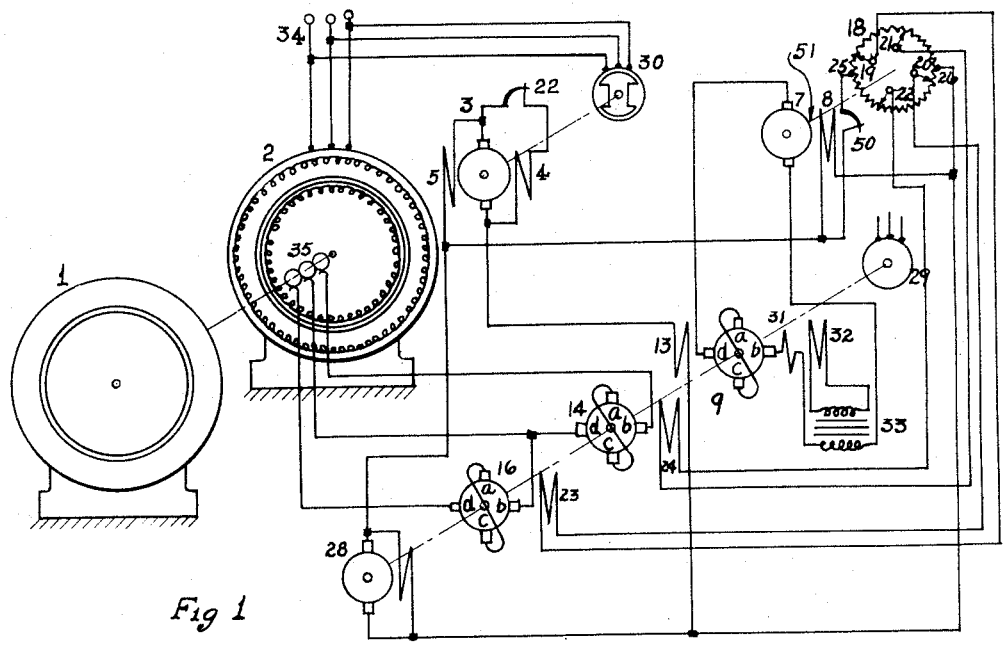

Oct. 24, 1950  J. M. PESTARINI  2,527,070
GENERATOR FREQUENCY CONTROL SYSTEM
Filed Sept. 23, 1948  2 Sheets-Sheet 1

INVENTOR.
J. M. Pestarini

INVENTOR

Patented Oct. 24, 1950

2,527,070

UNITED STATES PATENT OFFICE 2,527,070

GENERATOR FREQUENCY CONTROL SYSTEM

Joseph Maximus Pestarini, Staten Island, N. Y.

Application September 23, 1948, Serial No. 50,734

6 Claims. (Cl. 322—32)

1

This invention relates to alternating current generators, the shaft of which rotates at a speed different from that required for obtaining a desired frequency. In such a case, one may obtain the desired frequency by supplying the field inductor of the generator, generally the rotor, with a system of polyphase windings and by supplying the said windings with polyphase currents of an adequate frequency. The resulting rotating magnetic field has then a rotational speed equal to the algebraic sum of the speed of the shaft and of the rotational speed of the said magnetic field with respect to the rotor itself; the latter rotational speed is proportional to the frequency of the system of polyphase currents supplied to said rotor. By choosing an adequate value for the latter frequency, one may thus obtain any desired value for the frequency of the output currents independently of the speed of the shaft.

The present invention relates to a system controlling the frequency and the intensity of the polyphase currents supplied to the field inductor so that there is produced output currents of the desired frequency.

The control system of the present invention consists essentially of a regulator dynamo driven at a speed proportional to the frequency of the output currents of the main generator, as by means of a synchronous motor connected to the terminals of the stator winding of the main generator, the said regulator dynamo being able to supply the current, referred to as regulator current, varying very quickly for small discrepancies of the speed of the regulator dynamo, and after amplification, energizing an auxiliary dynamo controlling the frequency of the auxiliary generator of the polyphase system of currents supplied to the rotor of the main machine.

According to the invention, the auxiliary alternating current generator supplying the rotor of the main machine with a system of polyphase currents, may be either a conventional alternator or a generator of special design. One form of the special generator consists essentially of a dynamo provided with a polyphase system of brushes rotating with respect to the inductor of the said dynamo at a variable speed and collecting thus a polyphase system of currents. Another form of the special alternating generator consists essentially of a circular rheostat provided with a system of polyphase sliding contacts. The rheostat is traversed by direct current and the polyphase system of contacts collects thus a polyphase system of currents.

The polyphase system of currents of the special

2 generator feeding the field inductor of the main machine is preferably amplified, for instance, by means of amplifying metadynes, one metadyne being provided for each current of the polyphase system.

The invention is hereinafter fully described, reference being made to the accompanying drawings.

Figure 2:
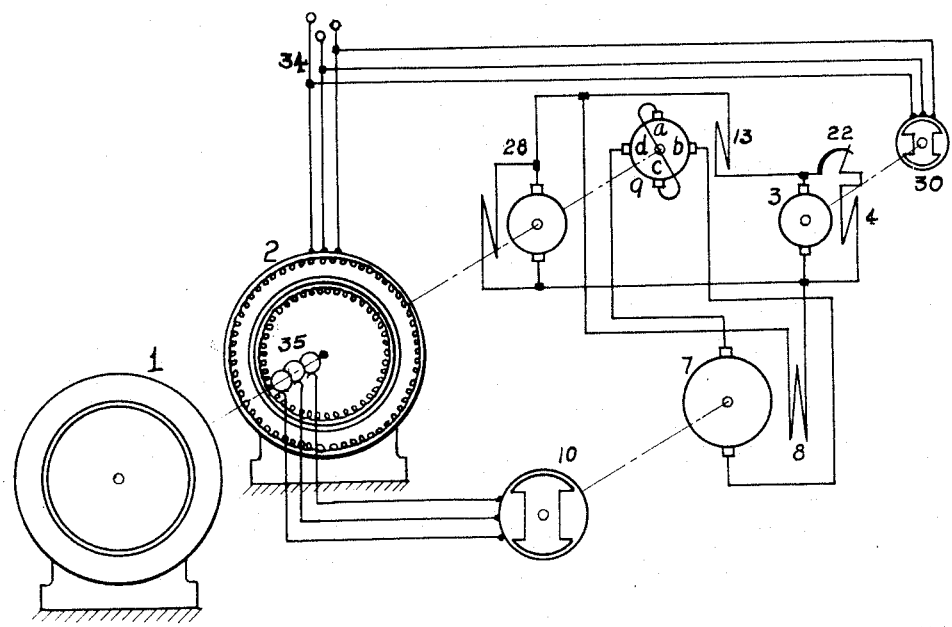
Figure 3:
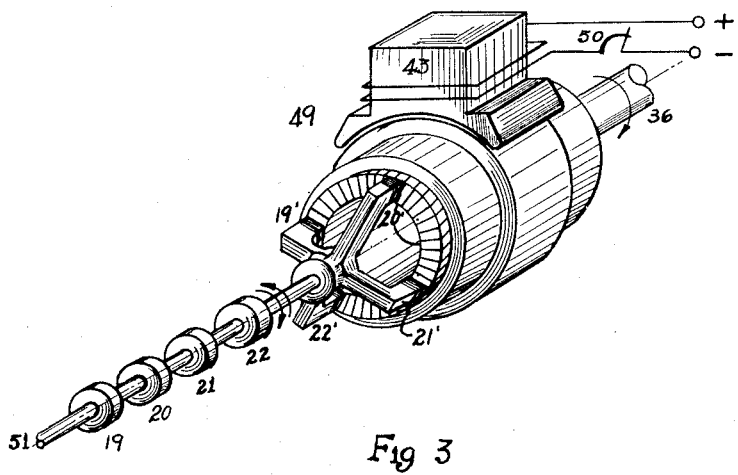
Figure 4:
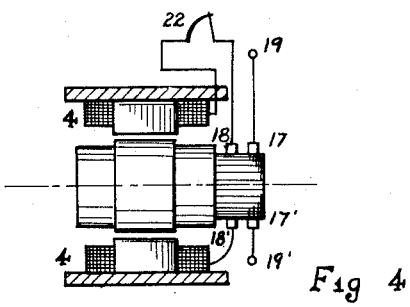
Figure 5:
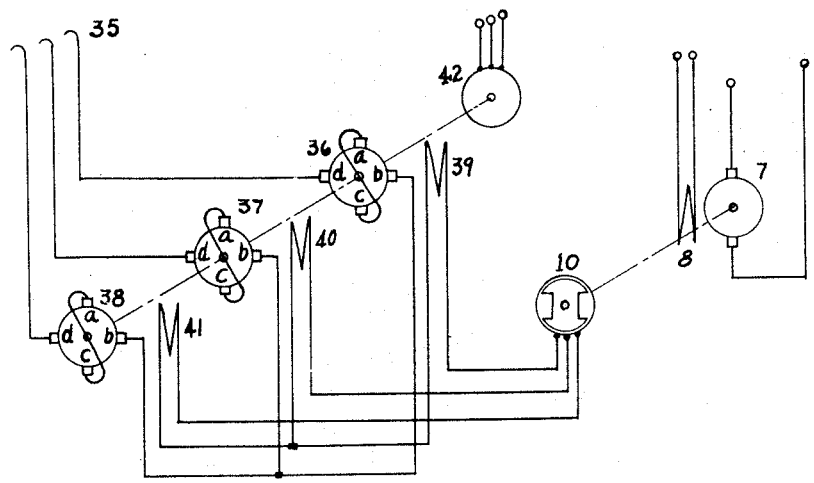

Figure 1 shows the complete scheme of an arrangement embodying the invention, the auxiliary alternating current generator taking the form of a circular rheostat with sliding polyphase contacts; Figure 2 shows a similar scheme where the auxiliary alternating current generator takes the form of a conventional alternator; Figure 3 shows a perspective view of an auxiliary alternating current generator which may be substituted for the circular rheostat shown in Figure 1; Figure 4 shows an improved form of the regulator dynamo; Figure 5 shows a scheme for the amplification of auxiliary alternating polyphase currents.

In Figure 1, two rotating machines 1 and 2 are indicated as mechanically coupled by a common shaft. The machine 2, which is driven by machine 1, takes the form of an alternating current, three phase generator having its terminals at 34 and having a rotor provided with a polyphase system of windings fed by currents carried through sliprings 35.

A small synchronous motor 30 is connected to the terminals 34 and drives a regulator dynamo 3 which is provided with a shunt excitation field winding 4 and is connected to a direct current source in the form of a shunt excited dynamo 28 driven by the motor 29.

The regulator dynamo 3 has the resistance of the circuit of its main field winding 4 set through the rheostat 22 so that the conductance, which is the inverse of the resistance, of the circuit in which the main field winding 4 is inserted, is equal to the ratio of the current traversing the main field winding 4 to the electromotive force induced in the armature of the said regulator dynamo 3 when the frequency of the currents of the terminals 34 is the desired one, and when the magnetic circuit of the regulator dynamo is unsaturated. Under such conditions, the regulator dynamo will yield no current if the frequency of the currents of the terminals 34 is the desired one and it will yield a current, referred to as regulator current, which varies very quickly for slight variations of the said frequency around the desired value.

The regulator current traverses the variator winding 13 of an amplifying metadyne 9 which in its turn supplies current, through its secondary brushes $b$ and $d$, to the armature of the auxiliary dynamo 7. The latter controls an auxiliary alternating current generator 18, consisting of a circular rheostat traversed at diametrically opposite points 25 and 26, by a direct current supplied by the direct current source 28. A system of polyphase slidable contacts 19, 20, 21 and 22 of the rheostat 18 are operated by a shaft 51 of the dynamo 7. The polyphase currents collected through sliprings of the slidable contacts are indicated on the figure as two biphase currents, one of which traverses the secondary variator winding 24 of an amplifying metadyne 14 while the other traverses the variator winding 23 of an amplifying metadyne 16. The amplified currents supplied by the secondary brushes $b$ and $d$ of the amplifying metadynes 14 and 16 are carried by means of three conductors to the sliprings 35 and thence to the rotating field inductor of the machine 2.

If the frequency of the generated currents is the desired one, the regulator current will be zero, the dynamo 7 will be at rest and the current collected by the polyphase system of sliding contacts will take the form of two direct currents which amplified through the amplifying metadynes 14 and 16 will create in the rotating field inductor of the main machine 2 a field fixed with respect to the said rotor.

If on the contrary, the frequency at the terminals 34 shows a slight discrepancy from the desired frequency, the regulator current will have a large value and after amplification, will cause the dynamo 7 to rotate and the polyphase system of sliding contacts to collect a polyphase system of currents, which amplied, will traverse the polyphase windings of the field inductor of the machine 2, creating a flux rotating with respect to the rotor. Thus the absolute speed of the rotating magnetic field will be that necessary for creating the desired frequency at the terminals 34, except for a slight differential sufficient for the creation of the necessary intensity of the regulator current.

It is important to observe that the intensity of the polyphase currents supplied by the amplifying metadynes 14 and 16 does not depend on the frequency of the said polyphase auxiliary currents.

It is also important to note that when the frequency of the polyphase auxiliary currents, is zero, and the dynamo 7 is at rest and the regulator current is zero, then the direct current supplied by the amplifying metadynes 14 and 16 will depend only on the setting of a resistor 50 inserted in the circuit supplying with current the terminals 25 and 26 of the circular rheostat 18. The rheostat 50 has the same function as a rheostat controlling the direct current intensity of the field inductor of an alternator.

In the example described above, a regulator dynamo has been considered with a main shunt field excitation winding 4. In order to increase the sensitivity of the regulator dynamo, a series excitation field winding 5 is provided, thus inducing an electromotive force substantially compensating the ohmic drop in the armature of the said regulator dynamo. For the same purpose a modified form of the regulator dynamo 3 may be provided with two sets of brushes, as shown by Figure 4. One set of brushes 17, 17' are connected to output current terminals 19, 19' and another set of brushes 18, 18' are connected to the shunt field winding 4. In the circuit of the winding 4, a setting rheostat 22 is inserted.

Other suitable forms of regulator dynamos may be used. The regulator dynamo has been described in previous patents of the same applicant, for instance, the United States Patent 1,962,030, patented June 1934, entitled "Rotary Transformer for Electric Direct Currents." The main excitation of the regulator dynamo may be a shunt or a series excitation.

The amplifying metadyne 9 represented in Figure 1 is indicated as provided with a secondary compensating winding or hypo-compensating winding 31, the action of which is clearly described in the British patent of the same applicant, 420,167, patented November 27, 1934, entitled "Improvements in Direct Current Dynamo Electrical Machines." Further the said amplifying metadyne 9 is indicated on Figure 1 as provided with an anti-hunting member of the secondary winding 32 connected to the secondary winding of a transformer 33, the primary winding of which is inserted in the secondary circuit of the amplifying metadyne 9. The action of the anti-hunting device is clearly explained in the United States patent of the same applicant, 2,203,544, patented June 4, 1940, entitled "Power System." The other amplifying metadynes 14 and 16 have been indicated in their elementary form for the sake of simplicity but it is understood that any amplifying metadyne may be used such as those described in previous patents of the same applicant, see for instance, the United States Patent 2,112,604, patented March 29, 1938, entitled "Direct Current Electrical Generator."

Instead of the circular rheostat being used as an auxiliary generator of alternating current, one may use a small dynamo 49 as indicated by Figure 3. The armature of this dynamo is indicated as driven by the shaft 36 relative to its field inductor 43. Coaxial with the shaft 36 is a shaft 51, adapted to be driven by the auxiliary dynamo 7 and carrying a polyphase system of brushes 19', 20', 21' and 22'. The polyphase system of currents generated by the armature are collected through the sliprings 19, 20, 21 and 22. The amplitude of the polyphase currents collected by the polyphase system of brushes is controlled by the rheostat 50 inserted in the circuit of the winding of the field inductor 43. When the regulator current is zero and therefore the system of polyphase brushes are stationary, the collected currents take the form of direct currents, the amplitude of which is controlled by the rheostat 50.

In Figure 2 a further arrangement embodying the invention is shown.

The machine 2 is indicated as an alternating current three phase generator with its rotor provided with a polyphase winding fed by currents carried by the sliprings 35 as previously described.

The small synchronous motor 30 connected to the terminals 34 of the machine 2, drives the shunt excited regulator dynamo 3 which is connected to the shunt excited dynamo 28. The regulator current of the dynamo 3 traverses the secondary variator winding 13 of the amplifying metadyne 9. The metadyne 9 energizes the auxiliary dynamo 7 through its secondary brushes $b$ and $d$. This dynamo 7 is independently excited by a field winding 8 and drives the auxiliary alternator 10. The alternator 10 induces the auxiliary alternating polyphase current feeding the field inductor windings of the machine 2. It is clear that in this case, the auxiliary alternating polyphase currents supplied by the alternator 10 have an intensity depending on their variable frequency and particularly, it is evident that the said currents have an intensity of zero when the regulator current is zero. Therefore the arrangement of Figure 2 can be applied only when the speed of the common shaft of the machines 1 and 2 is always different from the synchronous speed necessary to the desired frequency, while the previous arrangements indicated above do not have this limitation.

The alternating current supplied by the auxiliary alternator 10 may be amplified as indicated by Figure 5, wherein the three phase currents traverse the secondary variator windings 39, 40 and 41 of three separate amplifying metadynes 36, 37 and 38 respectively. The three amplifying metadynes are indicated on Figure 5 as driven by the alternating current motor 42.

The value of the frequency of the alternating currents created by the generator 2 is determined by the rotational speed of the regulator dynamo 3 and this value may be controlled by the setting rheostat 22 connected in series with winding 4, as shown in Figures 1, 2.

There are cases where it is desired to derive a variable frequency from the generator 2 and this can be easily obtained by modifying continuously the resistance of the resistor 22. This modification can be done either by hand or by means of a device moving the handle of the rheostat 22 according to an arbitrarily predetermined law.

I claim:

1. An electric power system comprising an alternating current generator including rotor and stator members, a rotative power shaft rotating at a predetermined speed coupled to the rotor of said generator, said rotor and stator members being provided with polyphase windings, one of said members operating as an inductor, the other of said members operating as an armature, a speed regulator dynamo having its operational speed arbitrarily determined, an auxiliary synchronous motor, an auxiliary dynamo, rotatable means for supplying an auxiliary system of polyphase currents, comprising output terminals, and a plurality of amplifier metadynes, each metadyne including an armature and stator windings, means for connecting said auxiliary synchronous motor to the polyphase windings of the armature member of said generator, means for mechanically coupling said auxiliary synchronous motor to said regulator dynamo, means for connecting a stator winding of one of said amplifier metadynes in series with the armature of said regulator current for energizing said metadyne, means for connecting said auxiliary dynamo with the last mentioned metadyne for energizing said auxiliary dynamo, means for coupling said auxiliary dynamo with said rotatable auxiliary polyphase current supplying means for controlling the frequency of said polyphase auxiliary currents, means for connecting the output terminals of said auxiliary polyphase current supplying means to the stator windings of the other metadynes for energizing them, means for connecting the armature of said other metadynes to the polyphase windings of the inductor member of said generator, whereby the frequency of the output currents of said generator is caused to be proportional to the operational speed of said regulator dynamo independently of the speed of said power shaft, resistor means for arbitrarily varying the value of said frequency by varying the resistance of the field exciting circuit of said regulator dynamo.

2. An electric power system comprising an alternating current generator including rotor and stator members, a rotative power shaft rotating at a predetermined speed coupled to the rotor of said generator, said rotor and stator members being provided with polyphase windings, one of said members operating as an inductor, the other of said members operating as an armature, a speed regulator dynamo having its operational speed arbitrarily determined, an auxiliary synchronous motor, an auxiliary dynamo, means for supplying a system of auxiliary polyphase currents comprising a rotatable direct current armature, a field inductor and a set of rotatable polyphase brushes, said armature rotating with respect to said field inductor, and a plurality of amplifier metadynes, each metadyne including an armature and stator windings, means for connecting said auxiliary synchronous motor to the polyphase windings of the armature member of said generator, means for mechanically coupling said auxiliary synchronous motor to said regulator dynamo, means for connecting a stator winding of one of said amplifier metadynes in series with the armature of said regulator current for energizing said metadyne, means for connecting said auxiliary dynamo with the last mentioned metadyne for energizing said auxiliary dynamo, means for coupling said auxiliary dynamo with said rotatable set of brushes for controlling the frequency of said polyphase auxiliary currents, means for connecting said rotatable brushes of said auxiliary polyphase current supplying means to the stator windings of the other metadynes for energizing them, means for connecting the armature of said other metadynes to the polyphase windings of the inductor member of said generator, whereby the frequency of the output currents of said generator is caused to be proportional to the operational speed of said regulator dynamo independently of the speed of said power shaft, resistor means for arbitrarily varying the value of said frequency by varying the resistance of the field exciting circuit of said regulator dynamo.

3. An electric power system comprising an alternating current generator including rotor and stator members, a rotative power shaft rotating at a predetermined speed coupled to the rotor of said generator, said rotor and stator members being provided with polyphase windings, one of said members operating as an inductor, the other of said members operating as an armature, a speed regulator dynamo having its operational speed arbitrarily determined, an auxiliary synchronous motor, an auxiliary dynamo, a direct current source, means for supplying an auxiliary system of polyphase currents comprising a circular resistor connected to said direct current source at diametrically opposite points of said circular resistor and a rotatable set of polyphase brushes slidably engaging said resistor, and a plurality of amplifier metadynes, each metadyne including an armature and stator windings, means for connecting said auxiliary synchronous motor to the polyphase windings of the armature member of said generator, means for mechanically coupling said auxiliary synchronous motor to said regulator dynamo, means for connecting a stator winding of one of said amplifier metadynes in series with the armature of said regulator current for energizing said metadyne, means for connecting said auxiliary dynamo with the last mentioned metadyne for energizing said auxiliary dynamo, means for coupling said auxiliary dynamo with said rotatable set of polyphase brushes, for controlling the frequency of said polyphase auxiliary currents, means for connecting said rotatable brushes of said auxiliary polyphase current supplying means to the stator windings of the other metadynes for energizing them, means for connecting the armature of said other metadynes to the polyphase windings of the inductor member of said generator, whereby the frequency of the output currents of said generator is caused to be proportional to the operational speed of said regulator dynamo independently of the speed of said power shaft, resistor means for arbitrarily varying the value of said frequency by varying the resistance of the field exciting circuit of said regulator dynamo.

4. An electric power system comprising an alternating current generator including rotor and stator members, a rotative power shaft rotating at a predetermined speed coupled to the rotor of said generator, said rotor and stator members being provided with polyphase windings, one of said members operating as an inductor, the other of said members operating as an armature, a speed regulator dynamo having its operational speed arbitrarily determined, an auxiliary synchronous motor, an auxiliary dynamo, an auxiliary alternator, and a plurality of amplifier metadynes, each metadye including an armature and stator windings, means for connecting said auxiliary synchronous motor to the polyphase windings of the armature member of said generator, means for mechanically coupling said auxiliary synchronous motor to said regulator dynamo, means for connecting a stator winding of one of said amplifier metadynes in series with the armature of said regulator current for energizing said metadyne, means for connecting said auxiliary dynamo with the last mentioned metadyne for energizing said auxiliary dynamo, means for coupling said auxiliary dynamo with said auxiliary alternator, for controlling the frequency of said polyphase auxiliary currents, means for connecting said auxiliary alternator to the stator windings of the other metadynes for energizing them, means for connecting the armature of said other metadynes to the polyphase windings of the inductor member of said generator, whereby the frequency of the output currents of said generator is caused to be proportional to the operational speed of said regulator dynamo independently of the speed of said power shaft, resistor means for arbitrarily varying the value of said frequency by varying the resistance of the field exciting circuit of said regulator dynamo.

5. An electric power system as described in claim 1, said regulator dynamo being provided with a main shunt field winding and an auxiliary series field winding inducing an electromotive force balancing the ohmic drop in the main circuit, said regulator dynamo being further provided with two sets of brushes one set for the current output and the other set being connected to the shunt field winding.

6. An electric power system comprising an alternating current generator including rotor and stator members, a rotative power shaft rotating at a predetermined speed coupled to the rotor of said generator, said rotor and stator members being provided with polyphase windings, one of said members operating as an inductor, the other of said members operating as an armature, a speed regulator dynamo having its operational speed arbitrarily determined, an auxiliary synchronous motor, an auxiliary dynamo, rotatable means for supplying an auxiliary system of polyphase currents, comprising output terminals and an amplifier metadyne including an armature and stator windings, means for connecting said auxiliary synchronous motor to the polyphase windings of the armature member of said generator, means for mechanically coupling said auxiliary synchronous motor to said regulator dynamo, means for connecting a stator winding of said amplifier metadyne in series with the armature of said regulator current for energizing said metadyne, means for connecting said auxiliary dynamo with said metadyne for energizing said auxiliary dynamo, means for coupling said auxiliary dynamo with said rotatable auxiliary polyphase current supplying means for controlling the frequency of said polyphase auxiliary currents, means for connecting the output terminals of said auxiliary polyphase current supplying means to the polyphase windings of the inductor member of said generator, whereby te frequency of the output currents of said generator is caused to be proportional to the operational speed of said regulator dynamo independently of the speed of said power shaft, resistor means for arbitrarily varying the value of said frequency of varying the resistance of the field exciting circuit of said regulator dynamo.

JOSEPH MAXIMUS PESTARINI.

No references cited